US005779767A

United States Patent [19]

Golden et al.

[11] Patent Number: 5,779,767
[45] Date of Patent: Jul. 14, 1998

[54] USE OF ZEOLITES AND ALUMINA IN ADSORPTION PROCESSES

[75] Inventors: Timothy Christopher Golden, Allentown, Pa.; Mohammed Ali Kalbassi, Walton-on-Thames, England; Fred William Taylor, Allentown, Pa.; Rodney John Allam, Guildford, England

[73] Assignee: Air Products and Chemicals, Inc., Allentown, Pa.

[21] Appl. No.: 814,749

[22] Filed: Mar. 7, 1997

[51] Int. Cl.⁶ .................................................. B01D 53/047
[52] U.S. Cl. .......................... 95/96; 95/106; 95/121; 95/126; 95/129; 95/139; 95/145; 95/902; 96/108; 96/143
[58] Field of Search .................... 95/96–106, 117–126, 95/139, 141, 145, 902; 96/108, 121, 130

[56] References Cited

U.S. PATENT DOCUMENTS

| | | | |
|---|---|---|---|
| 2,944,627 | 7/1960 | Skarstrom | 183/4.7 |
| 3,273,314 | 9/1966 | Quinn | 95/145 |
| 3,274,125 | 9/1966 | Clarke et al. | 252/466 |
| 3,287,884 | 11/1966 | Scofield | 95/145 |
| 3,557,025 | 1/1971 | Emerson et al. | 252/463 |
| 3,619,130 | 11/1971 | Ventriglio | 95/139 X |
| 3,865,924 | 2/1975 | Gidaspow et al. | 423/230 |
| 3,899,310 | 8/1975 | Chi et al. | 95/141 |
| 4,012,206 | 3/1977 | Macriss et al. | 95/125 X |
| 4,127,395 | 11/1978 | McKey et al. | 95/122 X |
| 4,130,484 | 12/1978 | Marwil et al. | 95/106 X |
| 4,134,743 | 1/1979 | Macriss et al. | 95/125 X |
| 4,153,429 | 5/1979 | Matthews et al. | 95/117 |
| 4,183,728 | 1/1980 | Leitzke et al. | 95/117 X |
| 4,249,915 | 2/1981 | Sircar et al. | 55/26 |
| 4,251,924 | 2/1981 | Beck et al. | 95/122 X |
| 4,264,340 | 4/1981 | Sircar et al. | 95/99 |
| 4,420,419 | 12/1983 | Ogawa et al. | 502/68 |
| 4,433,981 | 2/1984 | Slaugh et al. | 55/59 |
| 4,477,264 | 10/1984 | Kratz et al. | 55/25 |
| 4,477,364 | 10/1984 | Garcia | 252/142 |
| 4,493,715 | 1/1985 | Hogan et al. | 55/68 |
| 4,507,271 | 3/1985 | Van Deyck et al. | 95/106 X |
| 4,541,851 | 9/1985 | Bosquain et al. | 55/208 |
| 4,696,680 | 9/1987 | Ghate et al. | 95/103 |
| 4,711,645 | 12/1987 | Kumar | 55/26 |
| 4,713,090 | 12/1987 | Yokoe et al. | 95/96 |
| 4,762,537 | 8/1988 | Fleming et al. | 95/902 X |
| 4,775,396 | 10/1988 | Rastelli et al. | 55/58 |
| 4,795,735 | 1/1989 | Liu et al. | 95/139 X |
| 4,986,835 | 1/1991 | Uno et al. | 95/99 |
| 5,137,548 | 8/1992 | Grenier et al. | 55/23 |
| 5,232,474 | 8/1993 | Jain | 55/26 |
| 5,417,950 | 5/1995 | Sheu et al. | 95/902 X |
| 5,475,150 | 12/1995 | Rastelli et al. | 568/699 |
| 5,514,204 | 5/1996 | Sheu et al. | 95/121 X |
| 5,531,808 | 7/1996 | Ojo et al. | 95/101 X |
| 5,531,809 | 7/1996 | Golden et al. | 95/101 |
| 5,536,301 | 7/1996 | Lansbarkis et al. | 95/126 X |
| 5,614,000 | 3/1997 | Kalbassi et al. | 95/96 |
| 5,656,064 | 8/1997 | Golden et al. | 95/96 |

FOREIGN PATENT DOCUMENTS

| | | |
|---|---|---|
| 0173501 | 8/1985 | European Pat. Off. . |
| 0449576 | 3/1991 | European Pat. Off. . |
| 3045451 | 7/1981 | Germany . |
| 3702190 | 1/1987 | Germany . |
| 1648547 | 5/1989 | U.S.S.R. . |
| 1586961 | 8/1976 | United Kingdom . |

*Primary Examiner*—Robert Spitzer
*Attorney, Agent, or Firm*—Geoffrey L. Chase

[57] ABSTRACT

A process for the adsorption of at least carbon dioxide, water and oxides of nitrogen and preferably acetylene from a feed gas, comprises contacting the feed gas with an adsorbent mixture of a zeolite and an alumina. The process may be operated as a swing adsorption process comprising contacting the gas with the adsorbent at a first temperature and pressure to adsorb at least carbon dioxide, water and oxides of nitrogen therefrom and periodically regenerating the adsorbent by reducing the pressure and or increasing the temperature to which the adsorbent is exposed.

30 Claims, 3 Drawing Sheets

USE OF ZEOLITES AND ALUMINA IN ADSORPTION PROCESSES

BACKGROUND OF THE INVENTION

The invention relates to the field of adsorption processes including pressure swing adsorption (PSA), temperature swing adsorption (TSA) and hybrids of the two and provides processes for the removal of carbon dioxide, water and optionally acetylene and other impurities from a gas using improved adsorbents.

In conventional processes for cryogenic separation of air to recover $N_2$ and/or $O_2$, feed air is compressed, then cooled through expansion to low temperature before introduction to a two-stage distillation column. Unless water and $CO_2$ are removed from the air before cooling, these components will block heat exchangers employed for cooling the gas prior to distillation. Also, other air impurities can cause both freeze-out and safety problems. For example, nitrogen oxides including NO and $NO_2$ can form polymeric species $N_2O_4$ and $N_2O_5$ during reaction with $O_2$ from air. These higher nitrogen oxides freeze at temperatures which are present in the main heat exchanger. Consequently, these impurities must also be removed prior to the cold box. In addition, hydrocarbon impurities, especially acetylene, present in the feed air can cause explosion hazards if they enter the cold box. If acetylene enters the cold box it concentrates in the liquid oxygen section of the distillation column creating a severe safety problem. Thus, in addition to the removal of water and $CO_2$, other air impurities including nitrogen oxides and acetylene must be removed prior to the cold box.

There is also significant interest in removal of trace $CO_2$ and water from synthesis gas prior to cryogenic separation of CO and $H_2$. Typically CO and $H_2$ are produced by steam reforming methane to produce synthesis gas containing CO, $H_2$, $CO_2$, $H_2O$ and $CH_4$. The bulk of the $CO_2$ is then removed in an absorption unit. The trace levels of $CO_2$ and water which exit the scrubber must then be removed to low levels before introduction into the cryogenic distillation process. Traditionally, this is accomplished in a TSA process using zeolites. Improved adsorbents for $CO_2$ and water removal from air will also be useful for this application.

Two methods generally used for such carbon dioxide removal are temperature swing adsorption (TSA) and pressure swing adsorption (PSA).

In each of these techniques, a bed of adsorbent is exposed to flow of feed air for a period to adsorb carbon dioxide from the air. Thereafter, the flow of feed air is shut off from the adsorbent bed and the adsorbent is exposed to a flow of purge gas which strips the adsorbed carbon dioxide from the adsorbent and regenerates it for further use. In TSA, the heat needed to desorb the carbon dioxide from the adsorbent in the regeneration phase is supplied by heated regenerating gas. In PSA, the pressure of the purge gas is lower than that of the feed gas and the change in pressure is used to remove the carbon dioxide from the adsorbent with the heat required for desorption being supplied by heat of adsorption retained within the bed.

Other components can be removed from the feed air by these processes, including nitrogen oxides, hydrocarbons and water. These adsorption techniques can also be applied to feed gases other than air or to air to be purified for purposes other than use in an air separation plant.

Pressure swing adsorption (PSA) processes to remove $CO_2$ and water from air prior to cryogenic distillation have been developed (U.S. Pat. No. 4,477,364). Initially, these adsorbers consisted of a dual bed of alumina for water removal followed by zeolites like 13X for the removal of $CO_2$. More recently, all alumina PSA systems have been described (U.S. Pat. No. 5,232,474). The advantages of the all alumina system include lower adsorbent cost, vessel design which does not need screens to separate the two adsorbents and better thermal stability in the adsorption vessel during blowdown and repressurisation. Also, recent Patents (U.S. Pat. No. 5,137,548) have taught the use of low regeneration temperature (regeneration temperature a maximum of 50° C. above feed temperature) thermal swing adsorption (TSA) cycles. However, alumina adsorbents by themselves are not effective for removing all nitrogen oxides and some hydrocarbons during PSA and low temperature TSA operation. Therefore, a layering of adsorbents has been proposed as in U.S. Pat. No. 4,477,264, and GB 1586961. However, the layering of adsorbents is difficult when more exotic bed geometries, like radial bed flow adsorbers are employed (U.S. Pat. No. 4,541,851). Thus, the difficulty facing the industry is to find a single absorbent capable of removing various air impurities so that layering of adsorbents can be avoided. Layering of adsorbents can cause problems including:

1. a need for screens to separate materials,
2. different densities of materials can lead to localised fluidisation problems and channelling,
3. difficult bed loading for radial flow vessels, and
4. different adsorption characteristics for air leading to axial temperature fluctuations in the bed.

An early description of a PSA drier is U.S. Pat. No. 2,944,627. Using purge to feed ratios greater than 1.0 on an actual volume of gas basis it was found that using an alumina adsorbent the product air was devoid of water, $CO_2$ and oil vapour. No mention of acetylene or nitrogen oxides is made.

German Patent Publication DE 3045451 (1981) describes a PSA process which operates at 5°–10° C., 880 KPa adsorption pressure and 98 KPa regeneration pressure. Feed air is passed through a layer of 13X particles to remove the bulk of water vapour and $CO_2$ and then through a final layer of alumina for final clean-up. The alumina section can constitute 20–80% of the bed volume. The bed layering is claimed to reduce formation of "cold spots" in the adsorbent beds.

U.S. Pat. No. 4,711,645 described a PSA process for removal of water and $CO_2$ utilising alumina for water removal followed by a zeolite for $CO_2$ removal. It is claimed that the use of alumina for water removal allows adsorption at a lower temperature (due to its lower heat of adsorption) which increases the capacity of the zeolite for $CO_2$.

U.S. Pat. No. 4,249,915 describes a PSA process where water and $CO_2$ are removed from atmospheric air by adsorption in two separate beds. The moisture-laden bed is regenerated by PSA in a relatively short operating cycle, while the $CO_2$-laden bed is thermally regenerated at longer time intervals.

EP0449576 teaches using four discrete adsorbent layers, two of alumina followed by two more of zeolite, for front-end pre-purification. U.S. Pat. No. 4,711,645 teaches two discrete adsorption beds for pre-purification, namely an alumina bed for water removal, followed by a zeolite bed for $CO_2$ removal. Other patents including EP 1586961 and DE 3702190A1 all teach a layered bed with alumina or silica gel for water removal followed by 13X or 5A zeolite for $CO_2$ removal.

Finally, U.S. Pat. No. 5,232,474 teaches a PSA process for pre-purification of air using an initial layer of alumina which comprises 70 to 100% of the bed volume, with the remaining layer, if present, being a suitable zeolite. Thus, alumina may be the sole adsorbent present. The benefit of using a solely alumina bed is that it substantially reduces the cold zone that develops in a bed of zeolite during desorption. Since zeolites adsorb significantly more air than alumina, rapid desorption of air from the zeolite results in an acute temperature drop in the bed. The low temperature at which desorption occurs increases the amount of purge gas needed for regeneration. A further benefit of the all alumina bed is less void gas losses, since zeolites adsorb, and hence desorb, more air during blowdown.

The production of various improved materials for the bulk separation of $CO_2$ from gas streams in a PSA process has been described. For example, U.S. Pat. No. 4,775,396 teaches a faujasite-type zeolite having a given silica-alumina ratio and containing certain amounts of different exchangeable cations for use in PSA processes. A similar zeolite-based PSA absorbent is taught is EP 0173501. The materials are used for PSA removal of $CO_2$, but the concentration of $CO_2$ in the feed gas is significantly higher than the trace $CO_2$ which can be removed according to the present invention.

Various ways of treating alumina to produce improved materials for $CO_2$ removal from gas streams have been described. U.S. Pat. No. 4,493,715 teaches a method for removing $CO_2$ from olefin streams by contacting the feed gas with a regenerable, calcined adsorbent consisting essentially of from 1 to 6 wt % of an alkali metal oxide selected from the group consisting of sodium, potassium and lithium on alumina. The adsorbent was prepared by contacting alumina with an alkali metal compound which is convertible to the metal oxide on calcination.

U.S. Pat. No. 4,433,981 describes a process for removing $CO_2$ from a gaseous stream which comprises contacting the gas stream at a temperature up to about 300° C. with an adsorbent prepared by impregnation of a porous alumina with a sodium or potassium oxide. The corresponding oxide can be prepared by impregnation with a decomposable salt at calcining at a temperature of 350° to 850° C.

The preparation of another oxide-based $CO_2$ adsorbent is given in U.S. Pat. No. 3,274,125. The adsorbent is prepared from combinations of bivalent and trivalent metal salts which are decomposed to the corresponding oxide.

U.S. Pat. No. 3,557,025 teaches a method to produce alkalised alumina capable of adsorbing $SO_2$ by selectively calcining the alumina, and contacting with an alkali or ammonium bicarbonate salt to form at least 30% by weight alkalised alumina having the empirical formula of $MAl(OH)_2CO_3$.

GB Patent 1586961 describes a PSA process for the removal of $CO_2$, water and acetylene from air using an alumina adsorbent. Acetylene removal is accomplished with the use of other adsorbents in the bed or further adsorption beds but no other adsorbents are named.

U.S. Pat. No. 3,865,924 describes a process and apparatus for removal of $CO_2$ (up to 50%) from gas streams using a thermal regeneration process. A physical mixture of potassium carbonate and alumina is used as the adsorbent. In a preferred apparatus embodiment, the mixture is incorporated into a rotary regenerative wheel.

U.S. Pat. No. 5,232,474 discloses a PSA process using alumina in 70–100% of the bed volume to remove water and carbon dioxide from air. Preference is expressed for alumina containing up to 10% w/w silica as opposed to the generality of aluminas which typically contain only about 1% silica.

U.S. Pat. No. 5,475,150 describes the use of a mixture of alumina and 10–40% w/w sodium zeolite Y as a selective adsorbent for separating ethanol from ethyl t-alkyl ethers.

SU-1648547 describes purification of furfural with a mixture of basic alumina and zeolite MgA in a 40:60 to 60:40 ratio, with high temperature thermal regeneration.

It is also known (U.S. Pat. No. 4,420,419) to produce a granular, abrasion resistant zeolite by the use of an alumina binder in a granulation process.

DE 3702190 A1 discloses the removal of $C_2H_2$, $C_2H_4$ and $C_3H_6$ in addition to $CO_2$ and water.

BRIEF SUMMARY OF THE INVENTION

We have now found that alumina can be mixed with a zeolite and can be used successfully for removing carbon dioxide and water from gas streams without being maintained in separate beds or layers and that such a mixed adsorbent can moreover substantially improve the removal of impurities from a gas stream including not only the removal of carbon dioxide and water but also oxides of nitrogen and hydrocarbons, particularly $C_2H_2$.

Accordingly, the present invention provides a process for the adsorption of at least carbon dioxide and water from a feed gas, comprising contacting the feed gas with an adsorbent comprising a mixture of zeolite and an alumina.

Preferably, acetylene is adsorbed from said feed gas by the adsorbent as well as water and $CO_2$. Preferably also, oxides of nitrogen are removed as well as water and $CO_2$.

We have also found that treatment of alumina with a base without calcining to form alkali metal oxide can increase substantially the carbon dioxide adsorption capacity of the alumina that is regenerable under PSA conditions but which can also be used under low temperature TSA conditions. Such modified alumina may be used in admixture with zeolite according to this invention.

Accordingly, alumina used in the invention may be a modified alumina formed by impregnating alumina with a basic solution having a pH of 9 or more.

The beneficial effect of the treatment of the alumina with a basic solution may be due to the reaction of carbon dioxide with hydroxide ions in the basic environment of the alumina surface to form bicarbonate ions, although the applicant does not wish to be bound by this theory.

Preferably, the pH of the impregnating solution is at least 10, more preferably from 10 to 12. Best results have been obtained using an impregnating solution having a pH of about 11.

It is further preferred that the pH of the impregnating solution is related to the zero point charge (zpc) of the alumina according to the formula:

$pH \geq zpc - 1.4$ or more preferably by the formula:

$zpc + 2 \geq pH \geq zpc - 1.4$

Most preferably, the pH of the impregnating solution is related to the zero point charge of the alumina by the formula:

$zpc + 1 \geq pH \geq zpc - 1$

Said basic solution may suitably be a solution of an alkali metal or ammonium compound such as one selected from hydroxides, carbonates, bicarbonates, phosphates, and organic acid salts. Suitable basic compounds that may be employed include sodium, potassium or ammonium carbonate, hydroxide, bicarbonate, nitrate, formate, acetate, benzoate or citrate.

The most preferred basic compound for use in the invention is potassium carbonate.

A modified alumina for use in the invention may be prepared by making a solution of the chosen basic compound having an appropriate pH as described above and adding the solution to an alumina in a volume just sufficient to fill the pores of the alumina without producing surface wetness. The concentration and the amount of the solution may be chosen to produce a loading of the compound on the alumina of from 1 to 10% on a dry weight basis.

The treated alumina should be dried at a temperature which is not so high as to produce decomposition of the added compound to produce oxide which will bind carbon dioxide in a manner which cannot be reversed by reducing the gas pressure but only by elevated temperature, as in TSA. Thus U.S. Pat. No. 4,433,981 discloses treating alumina with a solution of sodium carbonate or other compounds, drying at 100° C., and then heat treating further at 575° C. This second heating step produces a material which is unsuitable for use in the PSA and low temperature TSA embodiments of processes of this invention. Drying is therefore preferably carried out at below 200° C., more preferably below 50° C.

DETAILED DESCRIPTION OF THE INVENTION

Figure 1:
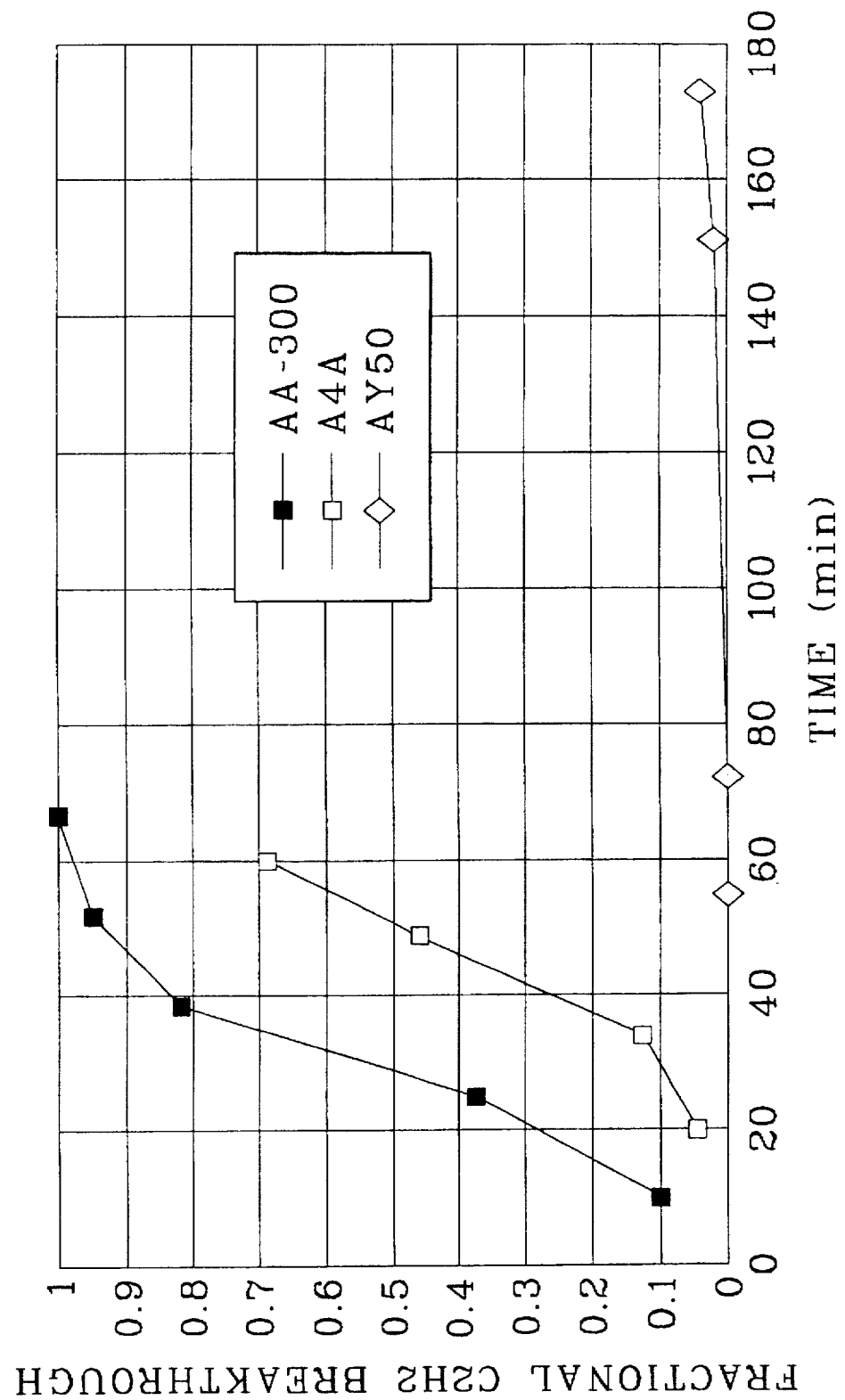
FIG. 1 shows in graphical form the results obtained in Example 3 for breakthrough of $C_2H_2$ comparing M-300, A4A and AY50.

The current invention has special relevance to the production and use of improved adsorbent materials for the production of dry, $CO_2$, acetylene and $NO_x$-free air by adsorption. This gas stream can then be fed to a cryogenic separation where either high purity $O_2$ or $N_2$ can be produced. The key requirements of improved adsorbents for this application include high $CO_2$ working capacity at low partial pressure to reduce bed size and minimal adsorption of primary air components, i.e. $O_2$ and $N_2$, to reduce temperature swings during absorbent vessel blowdown. The adsorbent should also have high, reversible capacity for acetylene, water and nitrogen oxides. The use of one adsorbent, as opposed to a plurality of separate layers of adsorbents or separate beds, for the removal of these trace components reduces bed loading problems (especially with radial flow vessels) and eliminates axial temperature variations in the bed due to different air adsorption properties of the different layers of adsorbent.

Thus, it is of interest to have a single adsorbent capable of removing water and trace acetylene, $CO_2$ and $NO_x$ from gas streams, such as; ambient air, natural gas or synthesis gas. It has been determined that composite adsorbents consisting of physical mixtures of alumina and zeolite satisfy the above requirements.

Preferably, the adsorbent contains from 10 to 90% by weight zeolite and from 90 to 10% by weight alumina, e.g. more preferably, from 20 to 80% zeolite and from 80 to 20% by weight alumina.

As explained below the zeolite preferably has a SVAI ratio of at least 1.0, more preferably of at least 2.0.

The process is preferably a swing adsorption process comprising contacting said gas with said adsorbent at a first temperature and pressure to adsorb at least carbon dioxide, water and oxides of nitrogen therefrom and periodically regenerating said adsorbent by reducing the pressure and/or increasing the temperature to which the adsorbent is exposed.

The swing adsorption process may be a pressure swing adsorption process, and is preferably then conducted according to the following parameters:

Feed pressure: 15 to 450 psig (305–3130 kPa)
Feed temperature: 5° to 50° C.
P/A ratio: 0.15 to 0.8
Cycle time: 10 to 80 minutes
Regeneration Temp: 10° to 60° C.
Purge pressure: −7 to 100 psig (152–910 kPa)
Feed $CO_2$ content: 1 to 1000 ppm Particularly preferred conditions for a pressure swing adsorption process are:

Feed pressure: 15 to 200 psig (305–1615 kPa)
Feed temperature: 10° to 40° C.
P/A ratio: 0.2 to 0.6
Cycle time: 10 to 80 minutes
Regeneration Temp: 20° to 50° C.
Purge pressure: 0 to 30 psig (202–408 kPa)
Feed $CO_2$ content: 200 to 600 ppm Alternatively, the processing may be a temperature swing adsorption process and is then preferably conducted according to the following parameters:

Feed pressure: 15 to 450 psig (305–3130 kPa)
Feed temperature: 5° to 50° C.
P/A ratio: 0.05 to 0.8
Cycle time: 60 to 900 minutes
Regeneration Temp: 30° to 250° C.
Purge pressure: −7 to 100 psig (152–910 kPa)
Feed $CO_2$ content: 1 to 1000 ppm More preferred TSA conditions are:

Feed pressure: 15 to 200 psig (305–1615 kPa)
Feed temperature: 10° to 40° C.
P/A ratio: 0.1 to 0.5
Cycle time: 120 to 300 minutes
Regeneration Temp: 50° to 150° C.
Purge pressure: 0 to 30 psig (202–408 kPa)
Feed $CO_2$ content: 200 to 600 ppm The process may be a hybrid between TSA and PSA.

Such a process recognises that water is more strongly adsorbed than carbon dioxide and during regeneration after depressurising the gas in contact with the adsorbent feeds a regenerating gas at a raised temperature in a direction counter-current to the feed direction to produce a heat pulse travelling in said counter-current direction to desorb said less strongly adsorbed carbon dioxide from the downstream (with respect to the feed direction) portion of the adsorbent by temperature swing adsorption (TSA) whilst at the same time desorbing the more strongly adsorbed water from the upstream (with respect to the feed direction) portion of the adsorbent by pressure swing adsorption (PSA). The flow of regenerating gas is ceased before the heat pulse travels as far as the upstream portion of the adsorbent in which is adsorbed the first contaminating gas component.

Such processes are described in more detail in U.S. Ser. No. 08/538,881 filed 10/4/95 (EP 9607225.1, U.S. Pat. No. 5,614,000).

Preferred operating parameters for such a hybrid PSA/TSA process are:

Feed pressure: 15 to 450 psig (305–3130 kPa)
Feed temperature: 5° to 60° C.
P/A ratio: 0.1 to 0.8
Cycle time: 40 to 600 minutes
Regeneration Temp: 20° to 120° C.
Purge pressure: −7 to 100 psig (152–910 kPa)
Feed $CO_2$ content: 1 to 1000 ppm Especially preferred process conditions are:

Feed pressure: 15 to 200 psig (305–1615 kPa)
Feed temperature: 10° to 50° C.
P/A ratio: 0.1 to 0.5
Cycle time: 60 to 200 minutes
Regeneration Temp: 30° to 100° C.
Purge pressure: 0 to 30 psig (202–408 kPa)
Feed $CO_2$ content: 200 to 600 ppm The regenerating gas may be heated to the low temperature required conveniently by heat exchange with heat generated in the main gas compressors which are used to compress the feed air stream.

The flow of regenerating gas may be at such a temperature throughout the regeneration period or, optionally, the flow of regenerating gas may be at such a temperature during a first part of the regeneration period and the temperature may then be reduced to a lower temperature, typically very similar to the temperature of the feed gas stream, for a further period of regeneration. In either case, a heat pulse produced by the heated regenerating gas will be progressively displaced through the adsorbent from the downstream end toward the upstream end and within the portion of the adsorbent in which carbon dioxide is adsorbed. Accordingly, regeneration ceases before that heat pulse has penetrated into the first portion of the adsorbent bed containing the water.

As compared to a PSA system, one does not need to seek to confine the heat generated by adsorption within the bed, as heat is replaced in the bed from the heated regenerating gas. This enables the cycle time to be extended and switch losses to be reduced. Also, because the carbon dioxide is more effectively removed from the downstream portion of the bed using the heated regenerating gas than it would be by PSA conducted without heating the regenerating gas at all, the effective regenerable capacity of the adsorbent for carbon dioxide is increased and the cycle time may be extended without break-through of the contaminating gas component from the bed.

Sufficient of the heat of adsorption from the on-line cycle will remain in the bed to allow desorption of water by PSA. Typically, there will be a drop in temperature of the adsorbent in the water adsorption zone due to net heat loss, but this will not be sufficient to prevent successful PSA regeneration.

A modified alumina for use in the invention may be prepared by making a solution of the chosen basic compound having an appropriate pH as described above and adding the solution to an alumina in a volume just sufficient to fill the pores of the alumina without producing surface wetness. The concentration and the amount of the solution may be chosen to produce a loading of the compound on the alumina of from 1 to 10% on a dry weight basis.

The treated alumina should be dried at a temperature which is not so high as to produce decomposition of the added compound to produce oxide which will bind carbon dioxide in a manner which cannot be reversed by reducing the gas pressure but only by elevated temperature, as in TSA. Thus U.S. Pat. No. 4,433,981 discloses treating alumina with a solution of sodium carbonate or other compounds, drying at 100° C., and then heat treating further at 575° C. This second heating step produces a material which is unsuitable for use in the processes of this invention.

Drying is therefore preferably carried out at below 200° C., more preferably below 150° C.

Preferably, the compound used to impregnate the alumina for use in the present invention does not cause water to react with the adsorbent so that it is not desorbed under the pressure swing conditions used. Non-reversible adsorption of water will progressively interfere with the adsorption of carbon dioxide. The use of materials of this type may be acceptable if water is removed first by an adsorbent in which it is reversibly adsorbed.

The invention will be further illustrated by the following examples. In the following examples, zero point charges of aluminas are measured by placing 20 grams of alumina in water and treating the pH after 24 hours. Henry's law constants ($K_2$) were measured as initial isotherm slopes in units of mmole/gram/atm after outgassing at a pressure of 50 microns of Hg (6.7 Pa) for 16 hours at 25° C., followed by repeated dosing with $CO_2$ at 30° C. and subsequent evacuation at 50 microns HG (6.7 Pa) pressure for 16 hours. Initial Henry's law constants ($K_1$) were measured similarly during the first dosing with $CO_2$. High $K_1$ values represent a larger capacity for adsorbing carbon dioxide in a manner that is not reversible by pressure swing but which may be reversible only by high temperature treatment. High $K_2$ values indicate the high regenerable (by pressure swing) capacities desired for the present invention.

The invention will be illustrated by the following examples.

EXAMPLE 1

$CO_2$ adsorption isotherms were measured on various adsorbents at 30° C. in a standard volumetric unit. The Henry's law constants (initial isotherm slopes) for $CO_2$ adsorption are given in the table below.

TABLE 1

| Adsorbent | (mmole/g/atm) $K_H$ @ 30° C. $CO_2$ |
|---|---|
| AA-300 alumina | 5.6 |
| 50% alumina/50% 4A zeolite (A4A) | 28.6 |
| 80% alumina/20% NaY zeolite (AY20) | 5.8 |
| 50% alumina/50% NaY zeolite (AY50) | 15.2 |

AA-300 is a standard dehydration alumina with a BET surface area of 325 $m^2/g$. Sample A4A is a composite adsorbent consisting of 50% alumina and 50% 4A zeolite. Sample AY20 is a composite of 80% alumina/20% NaY zeolite and AY50 is 50% alumina and 50% NaY zeolite. The results in Table 1 show that addition of zeolite into the alumina matrix increases the $CO_2$ capacity of the material at low partial pressures. It is $CO_2$ at these low partial pressures that is of interest for trace $CO_2$ removal from ambient or in comparison of the results of A4A with AY50 clearly shows that addition of 4A increases the $CO_2$ capacity more than NaY. This is not unexpected since NaY has a higher Si/Al ratio (2.5) than A zeolite (Si/Al=1.0). As the SVAl ratio of a zeolite increases, the amount of exchangeable cations decreases. The decrease in cation content noted in the Y zeolite results in lower $CO_2$ capacity. It is also expected that going from AY50 (50% zeolite) to AY20 (20% zeolite) a decrease in capacity is noted due to the decrease in zeolite content.

EXAMPLE 2

Composite zeolite/alumina adsorbents in Table 1 were tested in a single column PSA unit. The unit consisted of a single column 6 feet in length and 1 inch in diameter. The adsorbents were tested in a PSA cycle as follows:

1. feed with air containing 400 ppm $CO_2$ at 22° C., 100 psig (690 KPa) and a flow rate of 28 standard liters per minute.
2. countercurrent depressurisation to 10 psig.
3. purge with $N_2$ at 10 psig (69 KPa) and a flow rate of 15 standard liters per minute and
4. repressurisation with $N_2$ to feed pressure.

The total cycle time was twenty minutes with 9.8 minutes on feed and 9.8 minutes on purge. Table 2 gives the capacity of the four adsorbents under the identical cycles detailed above.

TABLE 2

| Adsorbent | (kg air treated/kg adsorbent/hr) Capacity |
| --- | --- |
| Alcan AA-300 | 3.54 |
| A4A | 3.85 |
| AY20 | 3.74 |
| AY50 | 5.00 |

The results exhibited in Table 2 show that the composite adsorbents have improved $CO_2$ capacity in PSA application relative to alumina alone. Unexpectedly, the best performance is seen with AY50, 50% alumina/50% NaY zeolite. Table 1 shows that A4A has a higher $CO_2$ capacity from the isotherm standpoint. However, in PSA cycling AY50 shows the best performance. This indicates that there is an optimum in PSA performance that does not correspond to the highest $CO_2$ capacity measured by adsorption isotherms. We explain this on the basis that PSA dynamic capacity is a combination of $CO_2$ adsorbed during the feed step and $CO_2$ desorbed during the purge step. Clearly, the results show that high capacity on feed does not yield the best PSA performance. The results in Table 2 indicate that zeolites with moderate $CO_2$ capacity, i.e. zeolites with Si/Al ratios greater than 1.0, are preferred for trace $CO_2$ removal from ambient air by PSA.

EXAMPLE 3

Composite adsorbents were also tested in a large scale TSA. The unit consisted of a column 0.21 meters in diameter by 2 meters in length. Temperature swing adsorption (TSA) cycles were conducted at 20° C., saturated with water and a maximum regeneration temperature of 80° C. FIG. 1 shows the breakthrough curve of $C_2H_2$ at 1 ppm inlet with adsorbents AA-300, A4A and AY50. Clearly, the composite adsorbents, A4A and AY50 show improved $C_2H_2$ capacity over the alumina adsorbent. In addition, the $C_2H_2$ capacity of AY50 is significantly higher than that of A4A. Again, the composite adsorbent with the higher Si/Al ratio shows improved performance.

Figure 2:
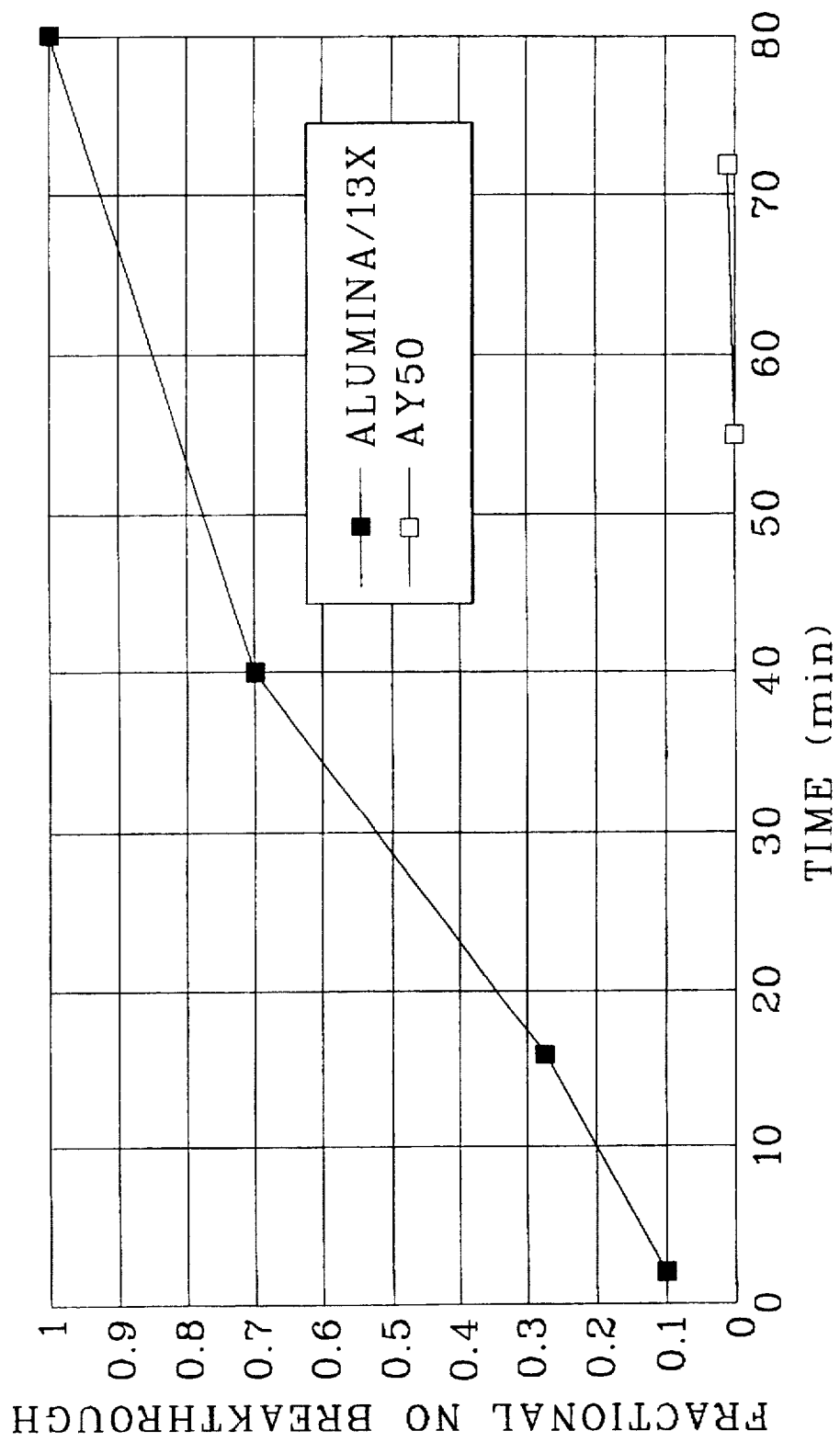
FIG. 2 shows in graphical form the results obtained in Example 3 for breakthrough of NO in layered alumina and 13 X-zeolite in contrast to composite AY50.

The NO breakthrough characteristics of composite adsorbents were also tested in TSA cycles as described above. FIG. 2 shows that composite absorbent AY50 outperforms a layered bed with 85% by volume alumina followed by 15% by volume 13X zeolite. This result shows that a composite alumina/zeolite adsorbent outperforms a layered alumina/zeolite bed. Also the high Si/Al ratio Y zeolite appears to outperform the lower Si/Al ratio zeolite A for this application.

EXAMPLE 4

PSA experiments were carried out in a 1 inch diameter by 6 foot long adsorption vessel. The cycle consisted of the following steps:

1) feed step at 25° C., 100 psig (690 KPa) and 28 liters/min to produce $CO_2$-free air.
2) counter-current blowdown to 10 psig (69 KPa).
3) counter-current purge with $N_2$ at 10 psig (69 KPa) and 15.1 liters/min and
4) repressurisation to 100 psig (690 KPa) with $N_2$.

The feed gas consisted of air with 400 ppm $CO_2$. Two different adsorbents were tested, CD alumina from Alcoa Corp (20% by weight NaY zeolite and 80% by weight alumina) and CD impregnated with 5 wt % $K_2CO_3$. To form this material an activated alumina was impregnated with a solution of $K_2CO_3$. Sufficient solution was added to just fill the pore volume of the alumina, the concentration of the solution being such as to produce a 5% by weight (solute/total weight of solids) loading of the solute on the alumina after drying at 120° C. The feed air processed under these conditions by the CD material was 5.8 $Nm^3$ of air processed/hr/kg of adsorbent. The corresponding value for the same material only impregnated with 5 wt % $K_2CO_3$ was 7.7 $Nm^3$ of air processed/hr/kg of adsorbent. This result shows that impregnation of the zeolite/alumina composite adsorbent with $K_2CO_3$ improves the feed air productivity by 33%.

TSA experiments were carried out in the same adsorption vessel described above. The cycle investigated was as follows:

1) feed step at 25° C., 100 psig (690 KPa) and 24 liters/min to produce $CO_2$-free air,
2) counter-current blowdown to 10 psig (69 KPa),
3) regeneration in $N_2$ at 80° C. and 10 liters/min,
4) cooldown in $N_2$ to 25° C. and
5) repressurisation to 100 psig (690 KPa) with $N_2$.

The feed gas again consisted of air with 400 ppm $CO_2$. Two adsorbents were tested including Alcoa CD (20% by weight NaY zeolite and 80% by weight alumina) and CDX (50% by weight NaY zeolite and 50% by weight alumina) impregnated with 5 wt% $K_2CO_3$. The productivity of the Alcoa CDX was 2.5 $Nm^3$/hr/kg while that for the impregnated material was 3.2 $Nm^3$/hr/kg. This result again shows that the $CO_2$ capacity of the promoted zeolite/alumina composite adsorbent exceeds that of the composite adsorbent alone.

EXAMPLE 6

$CO_2$ adsorption isotherms were measured at 30° C. on a composite adsorbent, Alcoa type CD, and CD impregnated with 10 wt % $K_3PO_4$. The Henry's law constants (initial isotherm slope) on the materials were 5.9 and 7.9 mmole/g/atm. respectively, for the CD and $K_3PO_4$/CD. This result shows that impregnation of the zeolite/alumina composite with a basic salt increases the $CO_2$ capacity of the material at low partial pressures.

EXAMPLE 7

Composite adsorbent CDX was tested in a large scale PSA. The unit consisted of a column 0.21 meters in diameter by 2 meters in length. The PSA cycles were conducted with air containing impurities at a feed temperature of 30° C. and saturated with water. The feed concentration of $C_2H_2$ and NO were 1042 and 5000 ppb respectively. The feed concentration of $CO_2$ was 400 ppm.

Figure 3:
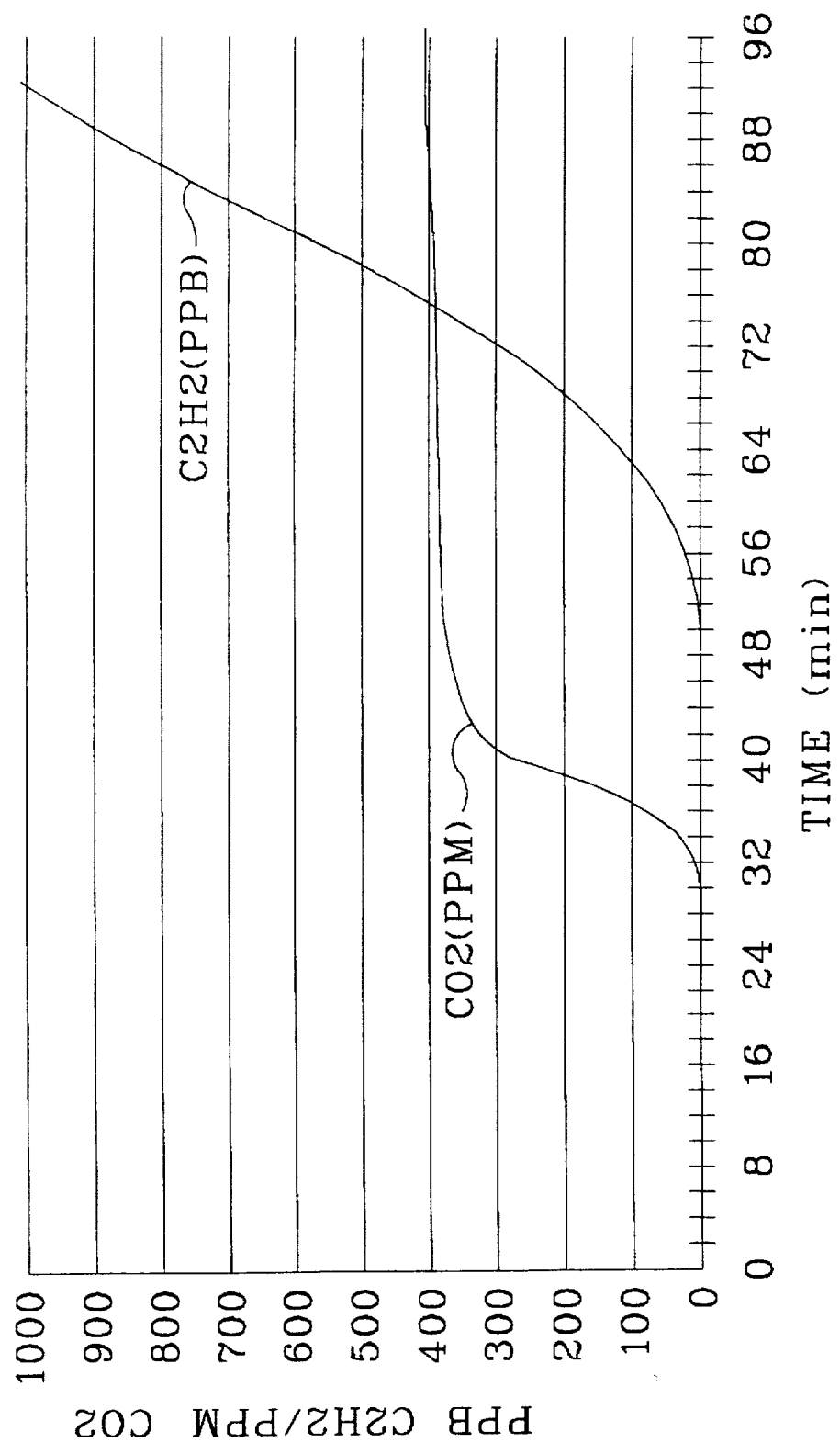
FIG. 3 shows in graphical form the results obtained in Example 7 for breakthrough of $C_2H_2$ and $CO_2$.

Feed Flow=76 Nm$_3$/h
Purge Flow=34.2 Nm$_2$/h
On Line Time=14 Minutes
Purge Time=12 Minutes The product concentration of NO, $H_2O$, and $C_2H_2$ were below lowest detectable limits of our analysers. FIG. 3 shows the relative breakthrough characteristics of $C_2H_2$ and $CO_2$ following steady state operation. Breakthrough on systems typically used without the composite adsorbent of the present invention required a 14 minute cycle time. As FIG. 3 indicates, breakthrough would allow this cycle time to be extended to approximately 28 minutes.

Whilst the invention has been described with reference to preferred embodiments thereof, many modifications and variations are possible within the scope of the invention.

We claim:

1. A process for the adsorption of at least carbon dioxide and water from a feed gas, comprising contacting the feed gas with a composite adsorbent comprising a fixture of a zeolite and an alumina.

2. A process as claimed in claim 1, in which acetylene is also adsorbed from said feed gas by said adsorbent.

3. A process as claimed in claim 1, in which nitrogen oxides are also adsorbed from said feed gas by said adsorbent.

4. A process as claimed in claim 1, wherein said feed gas is air.

5. A process as claimed in claim 1, wherein the adsorbent contains from 10 to 90% by weight zeolite and from 90 to 10% by weight alumina.

6. A process as claimed in claim 5, wherein the adsorbent contains from 20 to 80% zeolite and from 80 to 20% by weight alumina.

7. A process as claimed in claim 6, wherein the adsorbent contains from 30 to 50% by weight zeolite and from 70 to 50% by weight alumina.

8. A process as claimed in claim 1, wherein the zeolite has a Si/Al ratio of at least 1.0.

9. A process as claimed in claim 8, wherein the zeolite has a Si/Al ratio of at least 2.0.

10. A process as claimed in claim 9, wherein said zeolite is Na Y zeolite.

11. A process as claimed in claim 1, wherein said alumina is a modified alumina obtainable by impregnating a starting alumina with a basic solution having a pH of 9 or more.

12. A process as claimed in claim 11, wherein the pH of the impregnating solution is at least 10.

13. A process as claimed in claim 11, wherein the pH of the impregnating solution is from 10 to 12.

14. A process as claimed in claim 11, wherein the pH of the impregnating solution is about 11.

15. A process as claimed in claim 11, wherein the pH of the impregnating solution is related to the zero point charge of the alumina according to the formula:

$$pH \geq zpc - 1.4$$

16. A process as claimed in claim 15, wherein the pH of the impregnating solution is related to the zero point charge of the alumina by the formula:

$$zpc + 2 \geq pH \geq zpc - 1.4$$

17. A process as claimed in claim 15, wherein the pH of the impregnating solution is related to the zero point charge of the alumina by the formula:

$$zpc + 1 \geq pH \geq zpc - 1.$$

18. A process as claimed in claim 11, wherein said basic solution is a solution of an alkali metal or ammonium compound.

19. A process as claimed in claim 11, wherein said basic solution is selected for the group consisting of alkali metal or ammonium hydroxides, carbonates, bicarbonates, phosphates, and organic acid salts.

20. A process as claimed in claim 1, which is a swing adsorption process comprising contacting said gas with said adsorbent at a first temperature and pressure to adsorb at least carbon dioxide, water and oxides of nitrogen therefrom and periodically regenerating said adsorbent by reducing the pressure and or increasing the temperature to which the adsorbent is exposed.

21. A process as claimed in claim 20, which is a pressure swing adsorption process, conducted according to the following parameters:

Feed pressure: 15 to 450 psig (305–3130 kPa)
Feed temperature: 5° to 50° C.
Cycle time: 10 to 80 minutes
Regeneration Temp.: 10° to 60° C.
Purge pressure: −7 to 100 psig (152–910 kPa)
Feed $CO_2$ content: 1 to 1000 ppm.

22. A process as claimed in claim 20, which is a pressure swing adsorption process, conducted according to the following parameters:

Feed pressure: 15 to 200 psig (305–1615 kPa)
Feed temperature: 10° to 40° C.
Cycle time: 10 to 80 minutes
Regeneration Temp.: 20° to 50° C.
Purge pressure: 0 to 30 psig (202–408 kPa)
Feed $CO_2$ content: 200 to 600 ppm.

23. A process as claimed in claim 20, which is a temperature swing adsorption process, conducted according to the following parameters:

Feed pressure: 15 to 450 psig (305–3130 kPa)
Feed temperature: 5° to 50° C.
Cycle time: 60 to 900 minutes
Regeneration Temp.: 30° to 250° C.
Purge pressure: −7 to 100 psig (152–910 kPa)
Feed $CO_2$ content: 1 to 1000 ppm.

24. A process as claimed in claim 20, which is a temperature swing adsorption process, conducted according to the following parameters:

Feed pressure: 15 to 200 psig (305–1615 kPa)
Feed temperature: 10° to 40° C.
Cycle time: 120 to 300 minutes
Regeneration Temp.: 50° to 150° C.
Purge pressure: 0 to 30 psig (202–408 kPa)
Feed $CO_2$ content: 200 to 600 ppm.

25. A process as claimed in claim 20, which is a hybrid pressure and temperature swing adsorption process, conducted according to the following parameters:

Feed pressure: 15 to 450 psig (305–3130 kPa)
Feed temperature: 5° to 60° C.
Cycle time 40 to 600 minutes
Regeneration Temp.: 20° to 120° C.
Purge pressure: −7 to 100 psig (152–910 kPa)
Feed $CO_2$ content: 1 to 1000 ppm.

26. A process as claimed in claim 20, which is a hybrid pressure and temperature swing adsorption process, conducted according to the following parameters:

Feed pressure: 15 to 200 psig (305–1615 kPa)
Feed temperature: 10° to 50° C.
Cycle time 60 to 200 minutes
Regeneration Temp.: 30° to 100° C.
Purge pressure: 0 to 30 psig (202–408 kPa)
Feed $CO_2$ content: 200 to 600 ppm.

27. An adsorbent comprising a zeolite and a modified alumina comprising an activated alumina impregnated with a basic impregnant material.

28. An adsorbent as claimed in claim 27, wherein said-modified alumina is obtainable by impregnating a starting alumina with a basic solution having a pH of 9 or more.

29. An adsorbent as claimed in claim 27 which has not been heated to temperatures sufficient to decompose the impregnant.

30. An adsorbent as claimed in claim 27, wherein the modified alumina comprises activated alumina and a basic material selected from the group consisting of alkali metal or ammonium hydroxides, carbonates, bicarbonates, phosphates and organic acid salts.

* * * * *

UNITED STATES PATENT AND TRADEMARK OFFICE
CERTIFICATE OF CORRECTION

PATENT NO. : 5,779,767
DATED : Jul. 14, 1998
INVENTOR(S) : Golden, et al.

It is certified that error appears in the above-indentified patent and that said Letters Patent is hereby corrected as shown below:

Column 11, Claim 1, line 23, delete "fixture" and in its place insert -- mixture --.

Signed and Sealed this

Twenty-second Day of September, 1998

Attest:

BRUCE LEHMAN

*Attesting Officer*    *Commissioner of Patents and Trademarks*